(12) United States Patent
Adams et al.

(10) Patent No.: US 6,294,998 B1
(45) Date of Patent: Sep. 25, 2001

(54) MASK CONSTRUCTION FOR PROFILE CORRECTION ON AN RFID SMART LABEL TO IMPROVE PRINT QUALITY AND ELIMINATE DETECTION

(75) Inventors: Matthew T. Adams, Cincinnati; Kevin Girard Conwell, Fairfield, both of OH (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 09/591,473

(22) Filed: Jun. 9, 2000

(51) Int. Cl.⁷ ..................................................... G08B 13/14
(52) U.S. Cl. .................................. 340/572.8; 340/572.1; 361/752; 343/895; 29/829
(58) Field of Search ............................ 340/572.8, 572.1, 340/572.7, 551; 361/760, 762, 764, 772, 749, 777, 750, 751, 752, 807; 257/778, 781, 782, 783, 736, 750, 753; 343/895; 29/829

(56) References Cited

U.S. PATENT DOCUMENTS

| 4,710,040 | * | 12/1987 | Grey ........................................ 400/55 |
| 4,844,632 | * | 7/1989 | Minowa ........................... 400/120.17 |
| 5,422,660 | * | 6/1995 | Oikawa ................... 347/198 |
| 5,777,553 | * | 7/1998 | Perreau et al. ........................ 340/551 |
| 5,831,531 | * | 11/1998 | Tuttle ................................. 340/568.2 |
| 5,856,913 | * | 1/1999 | Heilbronner ......................... 361/760 |
| 5,982,284 | * | 11/1999 | Baldwin et al. ................... 340/572.8 |
| 6,147,604 | * | 11/2000 | Wiklof et al. ...................... 340/572.1 |

* cited by examiner

Primary Examiner—Benjamin C. Lee
(74) Attorney, Agent, or Firm—Orum & Roth

(57) ABSTRACT

An RFID with uniform profile. A compressible mask layer or cutout mask layer provides a uniform profile despite the presence of an RFID integrated circuit and antenna. The uniform profile allows clear overprinting and hinders visual detection of the RFID transponder.

4 Claims, 1 Drawing Sheet

MASK CONSTRUCTION FOR PROFILE CORRECTION ON AN RFID SMART LABEL TO IMPROVE PRINT QUALITY AND ELIMINATE DETECTION

BACKGROUND OF THE INVENTION

This invention relates to the labels, specifically RFID or smart labels.

Printers use a combination of heat and pressure to create an image on non-impact media (direct thermal or thermal transfer). The label surface is required to be smooth and uniform. Using standard paper and film materials for the construction of a smart-label (a label with an RFID transponder inserted in it) results in a non-uniform surface profile. The transponder circuit (IC chip and antenna) may leave a "ghost pattern" in the image when the label is printed. This pattern can be severe enough to leave print voids or changes in image density that would effect text readability or bar code scanning. This variation in image quality limits where the transponder can be placed in the label stock because it ultimately effects the quality of the bar code image resulting in scanning problems. To avoid this the printer would have to know the exact location of the transponder prior to printing, then print around it.

Furthermore, when a normal label construction is used for a smart label application, the transponder can be detected quite easily by noticing the change in the label profile in the location of the transponder. For some applications, the detection of the transponder is not desirable (security, anti-counterfeiting, etc.). The present invention addresses these problems.

SUMMARY OF THE INVENTION

This construction provides a label or tag with a uniform profile, even though a RF Transponder is inserted therein. A mask of similar thickness to the RF Transponder has a cut-out for the RF Transponder. When covered by a face sheet the mask with RF Transponder placed in the cut-out creates a uniform surface suitable for printing while at the same time concealing the presence of the RF Transponder. In a second embodiment, a compressible mask material is used, and a cutout is not required.

DETAILED DESCRIPTION

Figure 1:
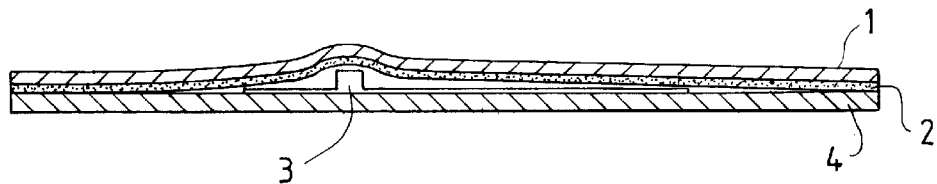
FIG. 1 is a side view of a prior art RFID label without mask material.

Prior art, represented by FIG. 1, commonly includes a layered construction comprising a facesheet (1) adhesive (2), RF Transponder (3) and liner (4). The RF Transponder (3) creates a non-uniform profile. The present invention is designed to provide a label with a uniform profile in spite of the existence of an inserted RF Transponder.

Figure 2:
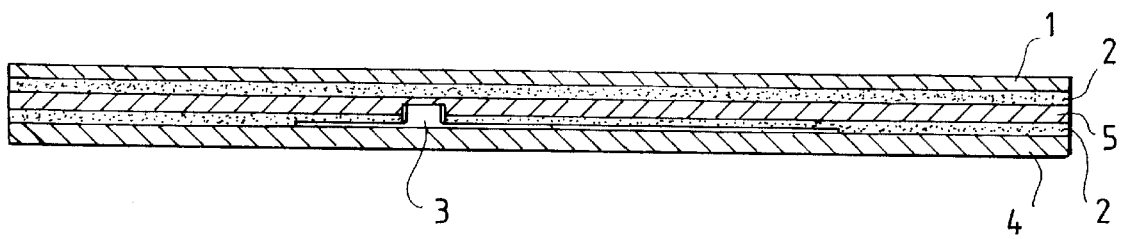
FIG. 2 is a side view of an RFID label with compressible mask material.

In a first embodiment, shown in FIG. 2, the mask can be made of a compressible material (such as foam). A layered construction comprises a facesheet (1), adhesive (2), compressible mask (5), adhesive (2), RF Transponder (3) and liner (4). The compressible nature of the mask allows it to conform/deform in the area of the transponder, providing a uniform profile when pressure is applied to the label (i.e. during the printing process).

Figure 3:
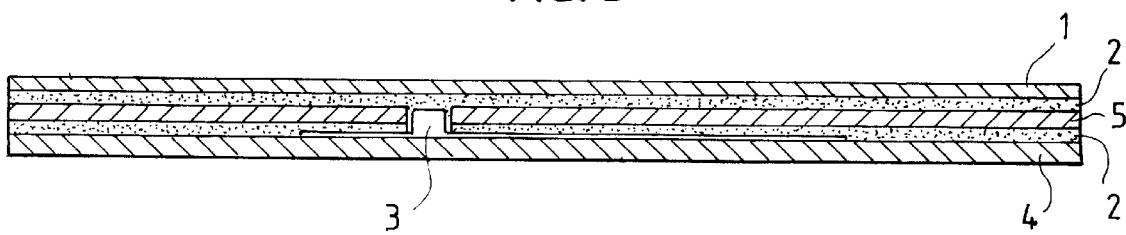
FIG. 3 is side view of an RFID label with cutout mask material.

In a second embodiment, shown in FIG. 3, the mask can be constructed of non-compressible material (such as 10-mil paperboard). A layered construction comprises a facesheet (1), adhesive (2), mask (6), adhesive (2), RF Transponder (3) and liner (4). For this mask material, the material must be converted so cavities are formed in the mask where the transponder integrated circuit is located. This will result in the formation of a uniform profile. By using an inserted mask, the profile of the label will become nearly uniform.

Furthermore, the mask construction will conceal the existence of the RF Transponder hidden inside the label. The uniform profile will eliminate indication that the transponder is present, thus reducing the risk of detection.

The compressible mask (5) material can be produced using a number of different foam tape material. The compressible mask material could be made from a low or medium density conformable open-cell foam tape double coated with adhesive such as 3M Urethane Series 4300, 4962 Neoprene Foam Tape, 4482 Polyethylene Foam Tape 4905 VHB Acrylic Foam Tape, or any similar conformable and compressible material that will form itself into and around the area of the transponder circuit and antenna. The preformed mask (6) material could also be produced in die cut patterns such that the mask is formed to lay around the perimeter of the transponder using a firm, high density, open-celled 3M Urethane Series 4100 or flexible medium to high density closed-cell 3M Vinyl Series 4700 and 4500.

The present invention is entitled to a range of equivalents, and is to be limited only by the scope of the following claims.

What is claimed is:

1. An RFID Label comprising:

a facesheet, a RFID Transponder, a mask with RF Transponder sized cut out, a liner, an adhesive, said facesheet applied with said adhesive to said mask, said RF Transponder positioned within said cut out, said mask having adhesive thereon attached to a liner for protecting said adhesive until use.

2. The RFID label of claim 1, wherein;

said mask is a high intensity open-celled urethane material.

3. The RFID label as claimed in claim 1, wherein;

said mask is a closed cell vinyl material.

4. The RFID Label as claimed in claim 1, wherein;

the label is linerless.

* * * * *